Patented June 9, 1942

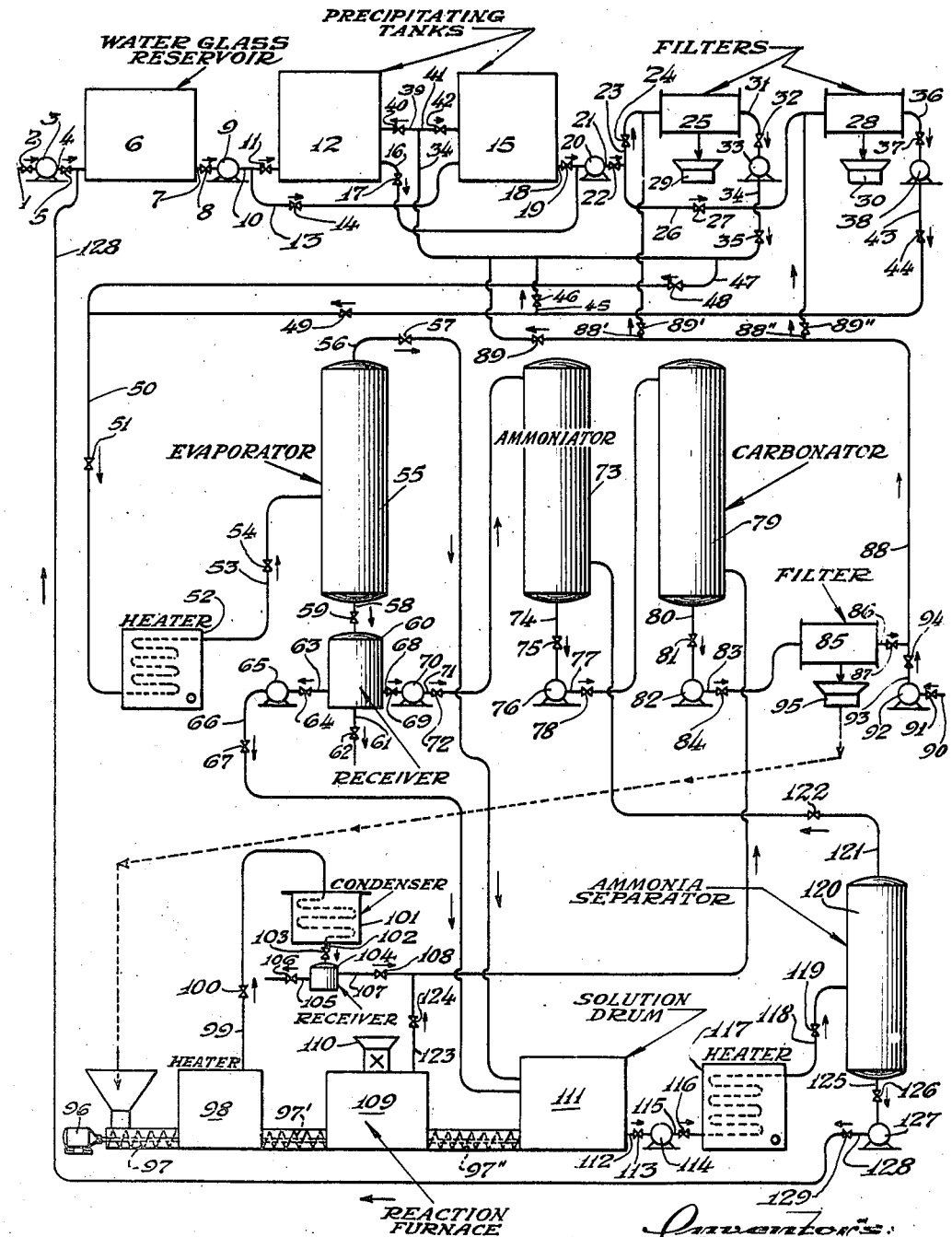

UNITED STATES PATENT OFFICE 2,285,396

MANUFACTURE OF CATALYSTS

Joseph D. Danforth and Charles L. Thomas, Chicago, Ill., assignors to Universal Oil Products Company, Chicago, Ill., a corporation of Delaware Application June 16, 1941, Serial No. 398,196

20 Claims. (Cl. 252—254)

This invention relates particularly to the manufacture of composite catalysts useful in hydrocarbon conversion reactions and specifically in the cracking of hydrocarbon oil fractions to produce gasoline therefrom or the reforming of low antiknock value gasolines to increase their antiknock properties.

The process involves a definite combination of cooperative steps whereby catalysts of high activity and definite composition are prepared so that the composition is uniform and owing to their being deficient in fluxing components they are utilizable for long periods of time involving alternate use and reactivation without loss in the essential catalytic properties.

The types of catalysts which can be manufactured by the process of the present invention are in general those containing two or more ingredients of a more or less refractory character which are in intimate admixture and which probably exert a cooperative catalytic action in the reactions in which they are used. Such catalysts comprise in general those of the silica-alumina type which are commonly prepared by methods involving the separate or simultaneous and concurrent precipitation of silica hydrogels and alumina or zirconia hydrogels which may be processed before or after their admixture to remove excess water and to wash out or otherwise eliminate alkali metal ions which are the principal cause of undesirable fluxing tendencies in service. Silica-alumina catalysts, for example, have been prepared by the following broad procedures.

1. Adding a solution of an aluminum salt to a solution of an alkali metal silicate which results in co-precipitation of hydrated silica and hydrated alumina in intimate admixture in the gel form.

2. Separate precipitation of silica gel by acidification of alkali metal silicate solutions followed by suspending the separated silica either before or after dehydration in a solution of an aluminum salt followed by treatment of the salt solution to precipitate an alumina hydrogel.

3. Separate precipitation of a silica hydrogel and an alumina hydrogel followed by mechanical mixing.

In all the above briefly recited methods of compositing, precautions are usually taken to eliminate alkali metal ions either by conducting the precipitations in the presence of ammonium salts or by washing the precipitated gels or the hydrated materials with acids or ammonium salts. The present process comprises a number of closely cooperative steps as a result of which catalytic materials of the silica-alumina type are produced in a relatively pure condition so that they are utilizable in hydrocarbon conversion reactions without further processing steps.

In one specific embodiment the present invention comprises a process for the continuous manufacture of catalytic hydrogels which comprises precipitating a silica hydrogel or a mixture of silica hydrogel and alumina hydrogel by adding a recirculated solution of ammonium chloride to aqueous solutions of alkali metal silicates and/or aluminum salts, separating silica or silica-alumina by mechanical filtration, concentrating, ammoniating and carbonating the filter effluent to precipitate alkali bicarbonate and regenerate said ammonium chloride solution, mechanically separating said alkali metal bicarbonate and returning said regenerated ammonium chloride solution for further use, drying and calcining said separated alkali metal bicarbonate to produce alkali metal carbonate, water and carbon dioxide, interacting said alkali metal carbonate with a source of silica to produce an alkali metal silicate and carbon dioxide, dissolving said alkali metal silicate in water and returning the solution to further interaction with said ammonium chloride solution.

The above brief description omits reference to several alternative operating features of the process such as the preliminary washing of the precipitated hydrogels with the recirculated ammonium chloride solution to remove a substantial portion of alkali metal compounds prior to the use of ammonium chloride solution as a precipitant and also some of the details of the concentrating, ammoniating and carbonating steps. These features will be brought out in greater detail in the subsequent portions of the present specification.

The accompanying drawing illustrates diagrammatically an arrangement of apparatus suitable for carrying out the process of the invention.

Referring to the drawing, line 1 containing valve 2 leading to pump 3 indicates an inlet line for the admission of sufficient alkali metal silicate solution for the starting of the process flow or for make-up due to incidental losses. Pump 3 discharges through line 4 containing valve 5 into water glass reservoir 6 which acts as an accumulator or buffer for making up for variations in the succeeding operating steps in which an alkali metal silicate such as sodium silicate is continuously produced from silica added from an outside source.

It is a feature of the present process that the hydrogels are precipitated in the presence of definite optimum concentrations of alkali metal chlorides so that they separate in an unusually finely divided condition which permits effective washing to remove alkali metal ions from the hydrogels and yields ultimately substantially pure materials which can be either used in a slurry in oils to be cracked or can be readily pelleted for use in fixed bed hydrocarbon conversion operations.

The principal supply of alkali metal silicate enters line 4 from line 128 and in reservoir 6 the concentration of alkali metal silicate and alkali metal chloride is maintained at an optimum point for subsequent precipitating, filtering and washing operations. The solution of alkali metal silicate and alkali metal chloride in regulated concentrations passing through line 7 containing valve 8 to a pump 9 which discharges through line 10 containing valve 11 to a precipitating tank 12 or through branch line 13 containing valve 14 to a precipitating tank 15 which is the volumetric and functional equivalent of tank 12. The precipitating tanks are preferably in parallel connection so that substantially continuous operations are possible, one tank being used for precipitation of hydrogels by the addition of ammonium chloride solution while the suspended hydrogels in the other are being filtered off and washed and the tank refilled with alkali metal silicate solution for another precipitating step. Thus line 16 containing valve 17 leads from precipitating tank 12 to the inlet line 18 of filter charging pump 20, valve 19 being used in conjunction with corresponding valve 17 to permit pump 20 to take suction on either tank 12 or tank 15 at the proper point in the cycle of precipitation and filtering.

The ammonium chloride solution for effecting the precipitation reaction comes from line 34 which branches either into line 39 containing valve 40 and leading to tank 12 or into line 41 containing valve 42 and leading into tank 15. The primary source of the recirculated ammonium chloride solution thus introduced will be developed at a later point in the description of the flow. The essential reaction taking place alternately in precipitating tanks 12 and 15 is exemplified by the following equation showing the reaction between sodium silicate and ammonium chloride, $$Na_2O.3SiO_2.xH_2O + 2NH_4Cl \rightarrow 2NaCl + 3SiO_2.xH_2O + 2NH_4OH$$

This essential equation may be modified when a salt of aluminum or zirconium is added along with the ammonium chloride solution so that mixed hydrogels of silica and alumina or zirconia are precipitated which can be dehydrated and calcined to produce active hydrocarbon conversion catalysts.

Filter charging pump 20 takes the suspension of hydrogel in the ammonium hydroxide-sodium chloride solution and discharges through line 21 containing valve 22 said line branching into line 23 containing valve 24 and leading to filter 25 or through line 26 containing valve 27 and leading to corresponding filter 28. Filters 25 and 28 may be of any suitable design either of the plate or rotary type. In these filters the hydrogels are separated from the aqueous menstruum and the suspended solids are separated and dropped into hoppers 29 and 30, respectively. The liquid effluent line from filter 25 is line 31 containing valve 32 which leads to pump 33 which discharges through line 34 containing valve 35 and thence through line 47 containing valve 48 to the evaporating, ammoniating and carbonating steps which will be presently described and which are used as steps in the manufacture of alkali metal silicates for the primary step of the process. Similarly the effluent from filter 28 follows line 36 containing valve 37 to pump 38 which discharges through line 43 containing valves 44 and 49 and thus to the evaporating, ammoniating and carbonating steps. As in the case of the precipitating tanks the filters are operated in a fixed cycle of steps so that while one filter is receiving the suspension of hydrogels from one of the precipitating tanks to build up a cake on the filter, the material on the other filter is being washed and emptied to yield the desired product of the process.

As one of the features of the present process the solid material accumulated on filter 25 or 28 may be washed with recirculating ammonium chloride solution prior to the use of the solution in the precipitating tanks. This washing with a relatively concentrated aqueous solutions of ammonium chloride results in the displacement of alkali metal ions in the solid materials constituting the filter cakes so that silica or silica-alumina composites may be recovered substantially free from alkali metals, the ammonia being driven off by subsequent calcining. Consequently the recirculated ammonium chloride solution, either all or in part, may enter line 23 leading to filter 25 from branch line 88' containing valve 89' and similarly the ammonium chloride solution may enter line 26 leading to filter 28 from a corresponding branch line 88" containing a valve 89". The effluent from filter 25, when the preliminary washing with ammonium chloride solution is conducted passes directly through line 34 to the precipitating tanks while the effluent from filter 28 branches from line 43 into line 45 containing valve 46 and thence to line 34. When the washing of the filter cakes with the recirculated ammonium chloride solution is not practiced, the solution passes directly to line 34 with valve 89 open and valves 89' and 89" closed.

In the normal operation of the present cyclic and regenerative process the solution recovered from filter 25 or 28 when the filter cake is being formed will consist essentially of ammonium hydroxide and sodium chloride with the latter salt in a concentration of from about 0.7 to about 1 pound of sodium chloride per gallon of solution. It has been found essential to the successful operating of the subsequent steps of the process aimed at the recovery of the ammonium chloride solution and the production of sodium carbonate for reaction with a source of silica, that this solution be concentrated to about ½ of its volume. Therefore the filter effluent from either filter 25 or 28 at the proper point in the operating cycle is passed through line 50 containing valve 51 through a heater 52 and thence through line 53 containing valve 54 to an evaporator 55, sufficient heat being imparted to the solution during its passage through the heater to permit the distillation of approximately half of the water and removal of substantially all of the ammonia in solution. The ammonia and water appearing as overhead vapors from evaporator 55, pass through line 56 containing valve 57 to solution drum 111 in which alkali silicate made in a subsequent step is dissolved.

The concentrated sodium chloride solution from the evaporator 55 passes through line 58 containing valve 59 to an intermediate accumulator or receiver 60 from which any excess of solution may be withdrawn through line 61 containing valve 62 and from which a portion of the concentrated solution is withdrawn for incorporation with the alkali metal silicate solution in drum 111. The portion of salt solution thus diverted passes through line 63 containing valve 64 to a pump 65 which discharges through line 66 containing valve 67 and leading to solution drum 111. The portion of the salt solution which is to be used for the regeneration of the ammonium chloride solution to be used in the primary precipitating tanks and for the production of alkali metal carbonate for reacting with silica to form alkali metal silicate passes through line 68 containing valve 69 to a pump 70 which discharges through line 71 containing a valve 72 and leading into the top of ammoniator 73, into the bottom of which ammonia gas from a subsequent step is passed from line 121. The salt solution flows downwardly countercurrent to the ascending ammonia gas and conditions of flow are regulated so substantially complete absorption of ammonia is obtained. The ammoniated salt solution passes through line 74 containing valve 75 to a pump 76 which discharges through a line 77 containing valve 78 into top of a carbonator 79 into the bottom of which carbon dioxide is introduced from a line 107. In this carbonator alkali metal bicarbonate separates as a solid so that a suspension of this solid in ammonium chloride solution passes through line 80 containing valve 81 to pump 82 which discharges through line 83 containing valve 84 into a filter 85 in which a solid cake of alkali metal bicarbonate is formed. This filter may represent one of any number of parallel units so that a cake may be forming on one while the cake is being removed from another or it may represent any type of continuous rotary filter. The alkali metal bicarbonate is removed continuously or intermittently into a hopper 95 while effluent solution containing ammonium chloride passes through line 86 containing valve 87 into line 88 and thence either to filters 25 and 26 or to precipitating tanks 12 and 15 as already described. If it is desired to make a silica-alumina composite a solution of aluminum chloride may be introduced to line 88 at this point by way of line 90, valve 91, pump 92 and pump discharge line 93 containing valve 94.

In the final steps of the present process the alkali metal bicarbonates accumulating in hopper 95 are heated and calcined to remove water and carbon dioxide and form normal carbonates which are then reacted with a source of silica to form water soluble alkali metal silicates which are subjected to treatment with recirculated ammonium chloride solution as already described. Thus the material accumulating in hopper 95 is transferred to a preliminary heater 98 by a conveyor represented as 97 in which a screw is activated by means of a prime mover 96 which delivers the bicarbonate to heater 98. In this heater which may be of any suitable construction for the heating of solid material, water and carbon dioxide are driven off and a normal carbonate is formed. The vapors of water and carbon dioxide thus pass through line 99 containing valve 100 and through a condenser 101 in which the water is condensed and the major portion of the carbon dioxide remains as a gas. The effluent materials in condenser 101 pass through line 102 containing valve 103 to a receiver 104 from which water is withdrawn through line 105 containing valve 106 and carbon dioxide is withdrawn through line 107 containing valve 108 and leading to carbonator 79 already described.

As indicated in the drawing the carbonate produced in heater 98 is conveyed to reaction furnace 109 by a conveying device 97' which may be actuated by the same prime mover as conveyor 97.

In reaction furnace 109 a source of silica is added through a hopper 110 and the materials are heated to a reaction temperature to produce a fused mass of alkali metal silicate and evolve the remainder of the carbon dioxide originally present in the bicarbonate. The carbon dioxide passes through line 123 containing valve 124 into line 107 leading to the carbonator.

The solid or fused alkali metal silicate is then conveyed to a solution drum 111 by means of a conveyor 97'' which again may be actuated by the same prime mover used for conveyors 97 and 97'. As already described any ammonia from evaporator 55 enters the solution drum from line 56 and a proportioned amount of the concentrated alkali metal chloride solution also enters from line 66. The solution at this point therefore contains alkali metal silicate and sodium chloride in the optimum proportions for further treatment as required in the original reservoir. It will also contain ammonia which is needed in the ammoniator. The solution from drum 111 passes through line 112 containing valve 113 to a pump 114 which discharges through line 115 containing valve 116 to a heater 117 in which the temperature is brought to a point which will insure substantially complete removal of the ammonia from the solution. The heated solution passes through line 118 containing valve 119 to ammonia separator 120, the ammonia evolved passing through line 121 containing valve 122 to the bottom of ammoniator 73. The solution containing the alkali metal silicate and alkali metal chloride is removed from the ammonia separator through line 125 containing valve 126 and passed back to reservoir 6 by pump 127 which discharges through line 128 containing valve 129.

The following example is given to illustrate the type of results normally obtainable in the operation of the process although it is not introduced with the intention of unduly limiting the proper scope of the invention.

Using the process flow described in connection with the drawing, water glass of 10 to 1 dilution containing 1 pound of sodium chloride per pound of dissolved water glass is used for the original precipitation. To the regenerated ammonium chloride solution sufficient aluminum chloride solution is added so that the hydrogel precipitated will contain silica and alumina in the approximate molal ratio of 10 to 1. The solution of ammonium chloride and aluminum chloride is pumped through a filter containing previously precipitated material and then into the precipitating tank at ordinary temperatures wherein mixing is effected by thorough mechanical agitation.

The filtered and washed material is calcined at a temperature of 1500° F. to yield a finely divided composite silica-alumina catalyst.

The effluent from the filter is concentrated to about ½ of its volume and half of the concentrated solution is subjected to ammoniation and succeeding carbonation to produce a precipitate of sodium bicarbonate, while the other half of the concentrated solution is transferred to the water glass solution drum. In the carbonation step the temperature is preferably kept below 85° F. to insure good separation of the bicarbonate. The suspension of sodium bicarbonate in ammonium chloride solution is filter pressed and the liquid effluent is returned for use in the further precipitation of the silica-alumina hydrogel composite in the alternate precipitating tank.

The separated bicarbonate is heated first to remove its water content and half of the carbon dioxide content and the normal carbonate is then reacted with a molal equivalent of silica in finely divided form to produce molten sodium silicate. This sodium silicate is dissolved in the sodium chloride solution from the primary evaporator following the hydrogel filters and sufficient make-up water is added to bring the concentration back to that originally used, that is, so that the sodium silicate is present as about 10% by weight of the solution and there is an equivalent amount of sodium chloride present. This solution is heated mildly to remove ammonia and returned for further use as a source of silica hydrogel.

We claim as our invention:

1. A process for the manufacture of finely divided silica hydrogel which comprises mixing an aqueous solution of an alkali metal silicate with an aqueous solution of ammonium chloride whereby to precipitate said silica hydrogel, separating the precipitated hydrogel, reducing the volume of the residual solution by about one-half by evaporation of water and ammonia therefrom, subjecting a portion of the concentrated solution to treatment with ammonia and then with carbon dioxide evolved from subsequent steps to precipitate alkali metal bicarbonate, separating said alkali metal bicarbonate from residual solution, returning said last-named residual solution containing ammonium chloride to further use in precipitating silica hydrogel, heating said alkali metal bicarbonate to drive off water and carbon dioxide and form the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first named portion of said concentrated solution, heating said last-named solution of alkali metal silicate to remove ammonia for use in the treatment of the first-named portion of said concentrated solution and returning said alkali metal silicate solution after removal of ammonia to further precipitation treatment.

2. A process for the manufacture of a relatively finely divided composite of silica hydrogel and alumina hydrogel which comprises mixing an aqueous solution of an alkali metal silicate with an aqueous solution of ammonium chloride and aluminum chloride whereby to precipitate said composite, separating the precipitated composite, reducing the volume of the residual solution by about one-half by evaporation of water and ammonia therefrom, subjecting a portion of the concentrated solution to treatment with ammonia and then with carbon dioxide evolved from subsequent steps to precipitate alkali metal bicarbonate, separating said alkali metal bicarbonate from residual solution, adding a solution of aluminum chloride to said last-named residual solution containing ammonium chloride and returning the mixed solution to further use in precipitating said composite, heating said alkali metal bicarbonate to drive off water and carbon dioxide and form the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first-named portion of said concentrated solution, heating said last-named solution to remove ammonia for use in the treatment of the first-named portion of said concentrated solution and returning said alkali metal silicate solution after removal of ammonia to further precipitation treatment.

3. A process for the manufacture of finely divided silica hydrogel which comprises mixing an aqueous solution of a sodium silicate with an aqueous solution of ammonium chloride whereby to precipitate said silica hydrogel, separating the precipitated hydrogel, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, returning said last-named residual solution containing ammonium chloride to further use in precipitating silica hydrogel, heating said sodium bicarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first named portion of said concentrated solution, heating said last-named solution to remove ammonia for use in the treatment of the first-named portion of said concentrated solution and returning said sodium silicate solution after removal of ammonia to further precipitation treatment.

4. A process for the manufacture of a finely divided composite of silica hydrogel and alumina hydrogel which comprises mixing an aqueous solution of a sodium silicate with an aqueous solution of ammonium chloride and aluminum chloride whereby to precipitate said composite, separating the precipitated composite, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, adding a solution of aluminum chloride to said last-named residual solution containing ammonium chloride and returning the mixed solution to further use in precipitating said composite, heating said sodium bicarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first-named portion of said concentrated solution heating said last-named solution to remove ammonia for use in the treatment of the first-named portion of said concentrated solution and returning said sodium silicate solution after removal of ammonia to further precipitation treatment.

5. A process for the manufacture of a relatively finely divided silica hydrogel which comprises mixing an aqueous solution of an alkali metal silicate and an alkali metal halide with an aqueous solution of ammonium chloride whereby to precipitate said silica hydrogel, separating the precipitated hydrogel, reducing the volume of the residual solution by about one-half by evaporation of water and ammonia therefrom, subjecting a portion of the concentrated solution to successive treatment with ammonia and with carbon dioxide evolved from subsequent steps to precipitate alkali metal bicarbonate, separating said alkali metal bicarbonate from residual solution, returning said last-named residual solution containing ammonium chloride to further use in precipitating silica hydrogel, heating said alkali metal bicarbonate to drive off water and carbon dioxide and form the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first-named portion of said concentrated solution, heating said last-named solution of alkali metal silicate to remove ammonia for use in the treatment of the first-named portion of said concentrated solution and returning said alkali metal silicate solution after removal of ammonia to further precipitation treatment.

6. A process for the manufacture of a relatively finely divided composite of silica hydrogel and alumina hydrogel which comprises mixing an aqueous solution of an alkali metal silicate and an alkali metal halide with an aqueous solution of ammonium chloride and aluminum chloride whereby to precipitate said composite, separating the precipitated composite, reducing the volume of the residual solution by about one-half by evaporation of water and ammonia therefrom, subjecting a portion of the concentrated solution to successive treatment with ammonia and with carbon dioxide evolved from subsequent steps to precipitate alkali metal carbonate, separating said alkali metal carbonate from residual solution, adding a solution of aluminum chloride to said last-named residual solution containing ammonium chloride and returning the mixed solution to further use in precipitating said composite, heating said alkali metal bicarbonate to drive off water and carbon dioxide and form the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first-named portion of said concentrated solution, heating said last-named solution to remove ammonia for use in the treatment of the first-named portion of said concentrated solution and returning said alkali metal silicate solution after removal of ammonia to further precipitation treatment.

7. The process of claim 5 wherein the aqueous solution of an alkali metal silicate contains approximately 10% by weight of said alkali metal silicate and approximately 10% by weight of said alkali metal halide.

8. The process of claim 6 wherein the aqueous solution of an alkali metal silicate and an alkali metal halide, contains approximately 10% by weight of said alkali metal silicate and approximately 10% by weight of said alkali metal halide.

9. A process for the manufacture of a relatively finely divided silica hydrogel which comprises mixing an aqueous solution of a sodium silicate and sodium chloride with an aqueous solution of ammonium chloride whereby to precipitate said silica hydrogel, separating the precipitated hydrogel, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, returning said last-named residual solution containing ammonium chloride to further use in precipitating silica hydrogel, heating said sodium bicarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first-named portion of said concentrated solution, heating said last-named solution to remove ammonia for use in the treatment of the first-named portion of said concentrated solution and returning said sodium silicate solution after removal of ammonia to further precipitation treatment.

10. A process for the manufacture of finely divided composite of silica hydrogel and alumina hydrogel which comprises mixing an aqueous solution of a sodium silicate and sodium chloride with an aqueous solution of ammonium chloride and aluminum chloride whereby to precipitate said composite, separating the precipitated composite, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, adding a solution of aluminum chloride to said last-named residual solution containing ammonium chloride and returning the mixed solution to further use in precipitating said composite, heating said sodium bicarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first-named portion of said concentrated solution heating said last-named solution to remove ammonia for use in the treatment of the first-named portion of said concentrated solution and returning said sodium silicate solution after removal of ammonia to further precipitation treatment.

11. The process of claim 9 wherein the aqueous solution of a sodium silicate and sodium chloride consists of approximately 10% by weight of said sodium silicate and approximately 10% by weight of said sodium chloride.

12. The process of claim 10 wherein the aqueous solution of a sodium silicate and sodium chloride consists of approximately 10% by weight of said sodium silicate and approximately 10% by weight of said sodium chloride.

13. A process for the manufacture of a relatively finely divided silica hydrogel which comprises mixing an aqueous solution of an alkali metal silicate and an alkali metal halide, said aqueous solution containing approximately 10% by weight of said alkali metal silicate and approximately 10% by weight of said alkali metal halide, with an aqueous solution of ammonium chloride whereby to precipitate said silica hydrogel, separating the precipitated hydrogel, washing a previously prepared portion of said precipitated hydrogel with said aqueous solution of ammonium chloride prior to said mixing, reducing the volume of the residual solution by about one-half by evaporation of water and ammonia therefrom, subjecting a portion of the concentrated solution to successive treatment with ammonia and with carbon dioxide evolved from subsequent steps to precipitate alkali metal bicarbonate, separating said alkali metal bicarbonate from residual solution, returning said last-named residual solution containing ammonium chloride to further use in washing and precipitating said silica hydrogel, heating said alkali metal bicarbonate to drive off water and carbon dioxide and form the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first-named portion of said concentrated solution, heating said last-named solution of alkali metal silicate to remove ammonia for use in the treatment of the first-named portion of said concentrated solution and returning said alkali metal silicate solution after removal of ammonia to further precipitation treatment.

14. A process for the manufacture of a relatively finely divided composite of silica hydrogel and alumina hydrogel which comprises mixing an aqueous solution of an alkali metal silicate and an alkali metal halide, said aqueous solution containing approximately 10% by weight of said alkali metal silicate and approximately 10% by weight of said alkali metal halide, with an aqueous solution of ammonium chloride and aluminum chloride whereby to precipitate said composite, separating the precipitated composite, washing a previously prepared portion of said precipitated composite with said aqueous solution of ammonium chloride and aluminum chloride prior to said mixing, reducing the volume of the residual solution by about one-half by evaporation of water and ammonia therefrom, subjecting a portion of the concentrated solution to treatment with ammonia and then with carbon dioxide evolved from subsequent steps to precipitate alkali metal bicarbonate, separating said alkali metal bicarbonate from residual solution, adding a solution of aluminum chloride to said last-named residual solution containing ammonium chloride and returning the mixed solution to further use in washing and precipitating said composite, heating said alkali metal bicarbonate to drive off water and carbon dioxide and form the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first-named portion of said concentrated solution, heating said last-named solution to remove ammonia for use in the treatment of the first-named portion of said concentrated solution and returning said alkali metal silicate solution after removal of ammonia to further precipitation treatment.

15. A process for the manufacture of finely divided silica hydrogel which comprises mixing an aqueous solution of a sodium silicate and sodium chloride, said aqueous solution consisting of approximately 10% by weight of said sodium silicate and approximately 10% by weight of said sodium chloride, with an aqueous solution of ammonium chloride, whereby to precipitate said silica hydrogel, separating the precipitated hydrogel, washing a previously prepared portion of said precipitated hydrogel with said aqueous solution of ammonium chloride prior to said mixing, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, returning said last-named residual solution containing ammonium chloride to further use in washing and precipitating said silica hydrogel, heating said sodium bicarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first-named portion of said concentrated solution, heating said last-named solution to remove ammonia for use in the treatment of the first-named portion of said concentrated solution and returning said sodium silicate solution after removal of ammonia to further precipitation treatment.

16. A process for the manufacture of a finely divided composite of silica hydrogel and alumina hydrogel which comprises mixing an aqueous solution of a sodium silicate and sodium chloride, said aqueous solution consisting of approximately 10% by weight of said sodium silicate and approximately 10% by weight of said sodium chloride, with an aqueous solution of ammonium chloride and aluminum chloride whereby to precipitate said composite, separating the precipitated composite, washing a previously prepared portion of said precipitated composite with said aqueous solution of ammonium chloride and aluminum chloride prior to said mixing, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, adding a solution of aluminum chloride to said last-named residual solution containing ammonium chloride and returning the mixed solution to further use in washing and precipitating said composite, heating said sodium bicarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first-named portion of said concentrated solution, heating said last-named solution to remove ammonia for use in the treatment of the first-named portion of said concentrated solution and returning said sodium silicate solution after removal of ammonia to further precipitation treatment.

17. A process for the manufacture of a relatively finely divided composite of silica hydrogel and zirconia hydrogel which comprises mixing an aqueous solution of an alkali metal silicate with an aqueous solution of ammonium chloride and zirconium chloride whereby to precipitate said composite, separating the precipitated composite, reducing the volume of the residual solution by about one-half by evaporation of water and ammonia therefrom, subjecting a portion of the concentrated solution to treatment with ammonia and then with carbon dioxide evolved from subsequent steps to precipitate alkali metal bicarbonate, separating said alkali metal bicarbonate from residual solution, adding a solution of zirconium chloride to said last-named residual solution containing ammonium chloride and returning the mixed solution to further use in precipitating said composite, heating said alkali metal bicarbonate to drive off water and carbon dioxide and for the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first-named portion of said concentrated solution, heating said last-named solution to remove ammonia for use in the treatment of the first-named portion of said concentrated solution and returning said alkali metal silicate solution after removal of ammonia to further precipitation treatment.

18. A process for the manufacture of a finely divided composite of silica hydrogel and zirconia hydrogel which comprises mixing an aqueous solution of a sodium silicate with an aqueous solution of ammonium chloride and zirconium chloride whereby to precipitate said composite, separating the precipitated composite, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, adding a solution of zirconium chloride to said last-named residual solution containing ammonium chloride and returning the mixed solution to further use in precipitating said composite, heating said sodium bircarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first-named portion of said concentrated solution heating said last-named solution to remove ammonia for use in the treatment of the first-named portion of said concentrated solution and returning said sodium silicate solution after removal of ammonia to further precipitation treatment.

19. A process for the manufacture of a relatively finely divided composite of silica hydrogel and zirconia hydrogel which comprises mixing an aqueous solution of an alkali metal silicate and an alkali metal halide with an aqueous solution of ammonium chloride and zirconium chloride whereby to precipitate said composite, separating the precipitated composite, reducing the volume of the residual solution by about one-half by evaporation of water and ammonia therefrom, subjecting a portion of the concentrated solution to successive treatment with ammonia and with carbon dioxide evolved from subsequent steps to precipitate alkali metal bicarbonate, separating said alkali metal bicarbonate from residual solution, adding a solution of zirconium chloride to said last-named residual solution containing ammonium chloride and returning the mixed solution to further use in precipitating said composite, heating said alkali metal bicarbonate to drive off water and carbon dioxide and form the corresponding normal carbonate, reacting said normal carbonate with silica to produce alkali metal silicate and further amounts of carbon dioxide, adding the remaining portion of said concentrated solution and the water and ammonia from said evaporation to said alkali metal silicate to form a solution thereof, returning said carbon dioxide to treat said first-named portion of said concentrated solution, heating said last-named solution to remove ammonia for use in the treatment of the first-named portion of said concentrated solution and returning said alkali metal silicate solution after removal of ammonia to further precipitation treatment.

20. A process for the manufacture of finely divided composite of silica hydrogen and zirconia hydrogel which comprises mixing an aqueous solution of a sodium silicate and sodium chloride with an aqueous solution of ammonium chloride and zirconium chloride whereby to precipitate said composite, separating the precipitated composite, reducing the volume of the residual solution by about one-half by evaporation of water and ammonia therefrom, subjecting a portion of the concentrated solution to treatment with ammonia and then with carbon dioxide evolved from subsequent steps to precipitate sodium bicarbonate, separating said sodium bicarbonate from residual solution, adding a solution of zirconium chloride to said last-named residual solution containing ammonium chloride and returning the mixed solution to further use in precipitating said composite, heating said sodium bicarbonate to drive off water and carbon dioxide and form the corresponding normal carbonate, reacting said normal carbonate with silica to produce sodium silicate and further amounts of carbon dioxide, adding the remaining portion of said concentrated solution and the water and ammonia from said evaporation to said sodium silicate to form a solution thereof, returning said carbon dioxide to treat said first-named portion of said concentrated solution heating said last-named solution to remove ammonia for use in the treatment of the first-named portion of said concentrated solution and returning said sodium silicate solution after removal of ammonia to further precipitation treatment.

JOSEPH D. DANFORTH.
CHARLES L. THOMAS.